United States Patent [19]

Skorecki

[11] Patent Number: 4,515,122
[45] Date of Patent: May 7, 1985

[54] MOUNTING FOR A VIBRATING SYSTEM
[75] Inventor: Jan Skorecki, Bramhall, England
[73] Assignee: National Research Development Corporation, London, England
[21] Appl. No.: 486,943
[22] Filed: Apr. 20, 1983
[30] Foreign Application Priority Data
Apr. 26, 1982 [GB] United Kingdom ............... 8211972
[51] Int. Cl.³ ............................................. F02B 77/00
[52] U.S. Cl. ........................... 123/198 E; 123/195 C; 123/195 S
[58] Field of Search ............ 123/198 E, 195 C, 195 S; 180/300

[56] References Cited

U.S. PATENT DOCUMENTS

| | | | |
|---|---|---|---|
| 4,151,822 | 5/1979 | Miura et al. ..................... | 123/198 E |
| 4,183,344 | 1/1980 | Kirchweger et al. .......... | 123/195 C |
| 4,186,714 | 2/1980 | Danckert et al. ............... | 123/195 C |
| 4,203,409 | 5/1980 | Fachbach et al. .............. | 123/198 E |
| 4,261,105 | 4/1981 | Love ............................... | 123/198 E |
| 4,377,993 | 3/1983 | List ................................. | 123/198 E |
| 4,378,763 | 4/1983 | Lshihama ........................ | 123/198 E |
| 4,388,899 | 6/1983 | Shimada et al. ................ | 123/198 E |

Primary Examiner—Ira S. Lazarus
Attorney, Agent, or Firm—McDougall, Hersh & Scott

[57] ABSTRACT

A mounting for interposition between a vibrating system such as an internal combustion engine and a support base such as a vehicle body. The mounting comprises a deformable structure supporting the vibrating system and defining a load transmitting path between the system and the base. An external force is applied to a portion of the deformable structure spaced from the load transmitting path in synchronism with the vibration of the system such that the force exerted by the mounting of the support is substantially constant despite the vibration.

2 Claims, 9 Drawing Figures

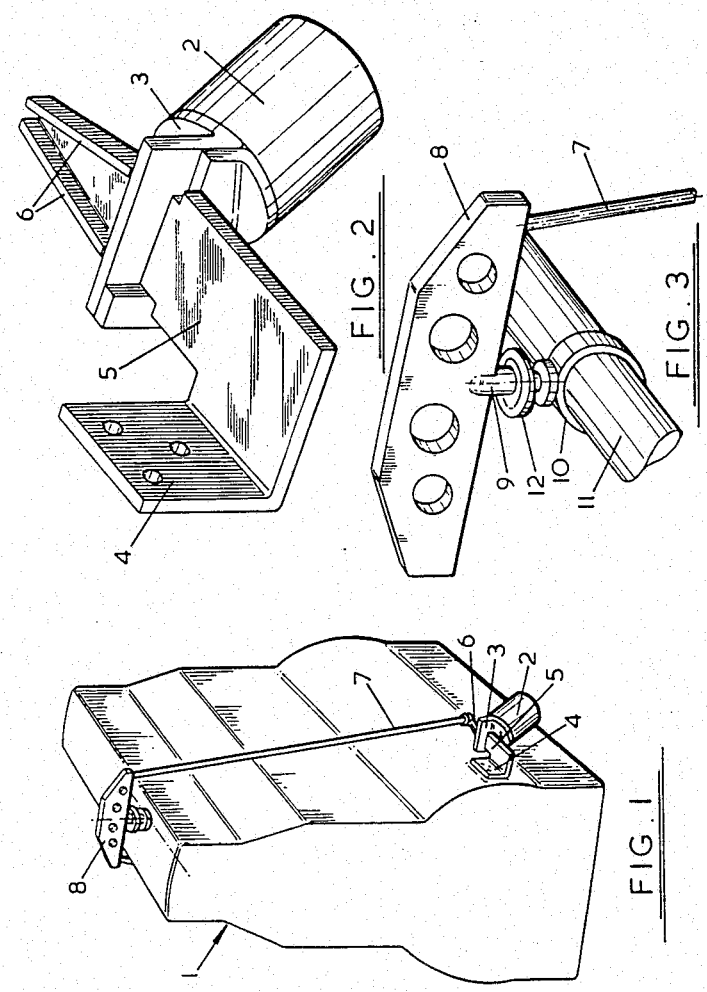

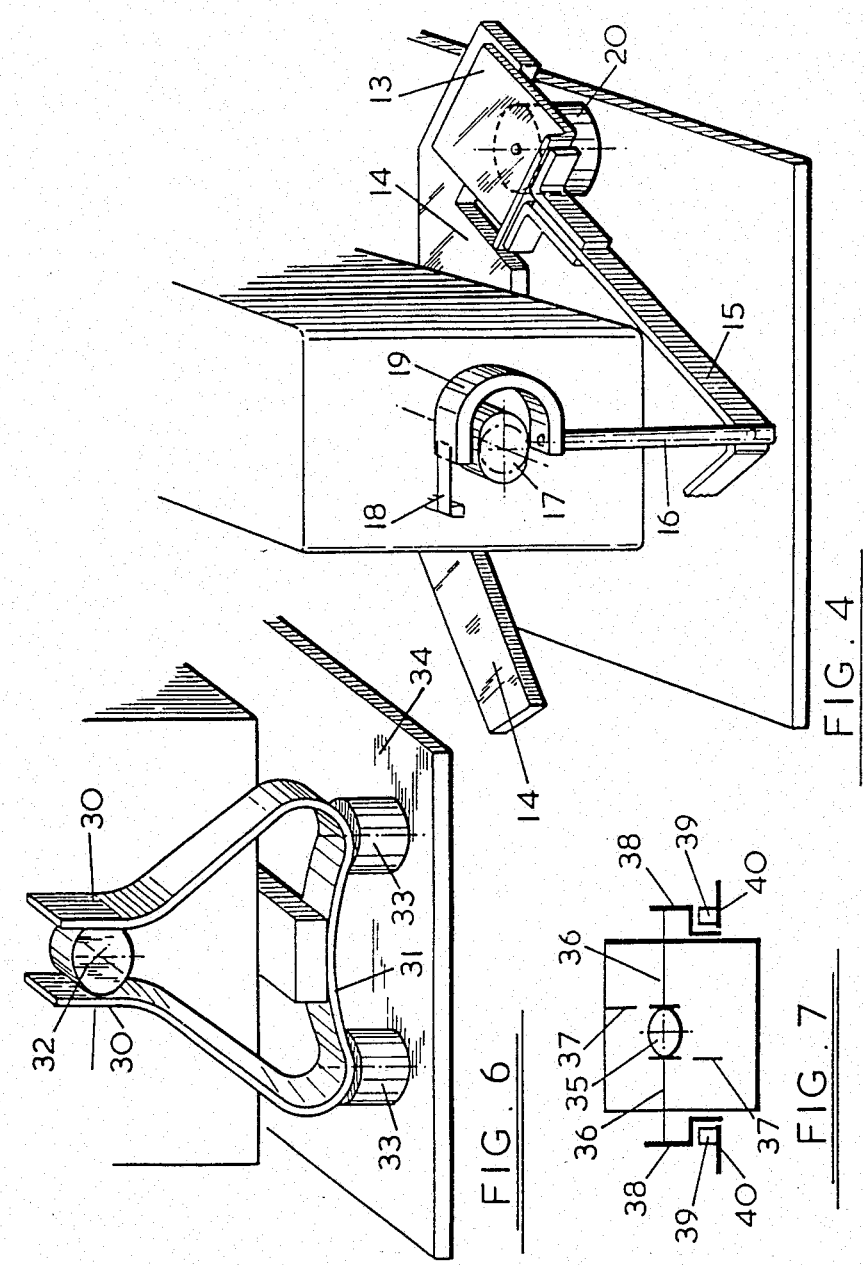

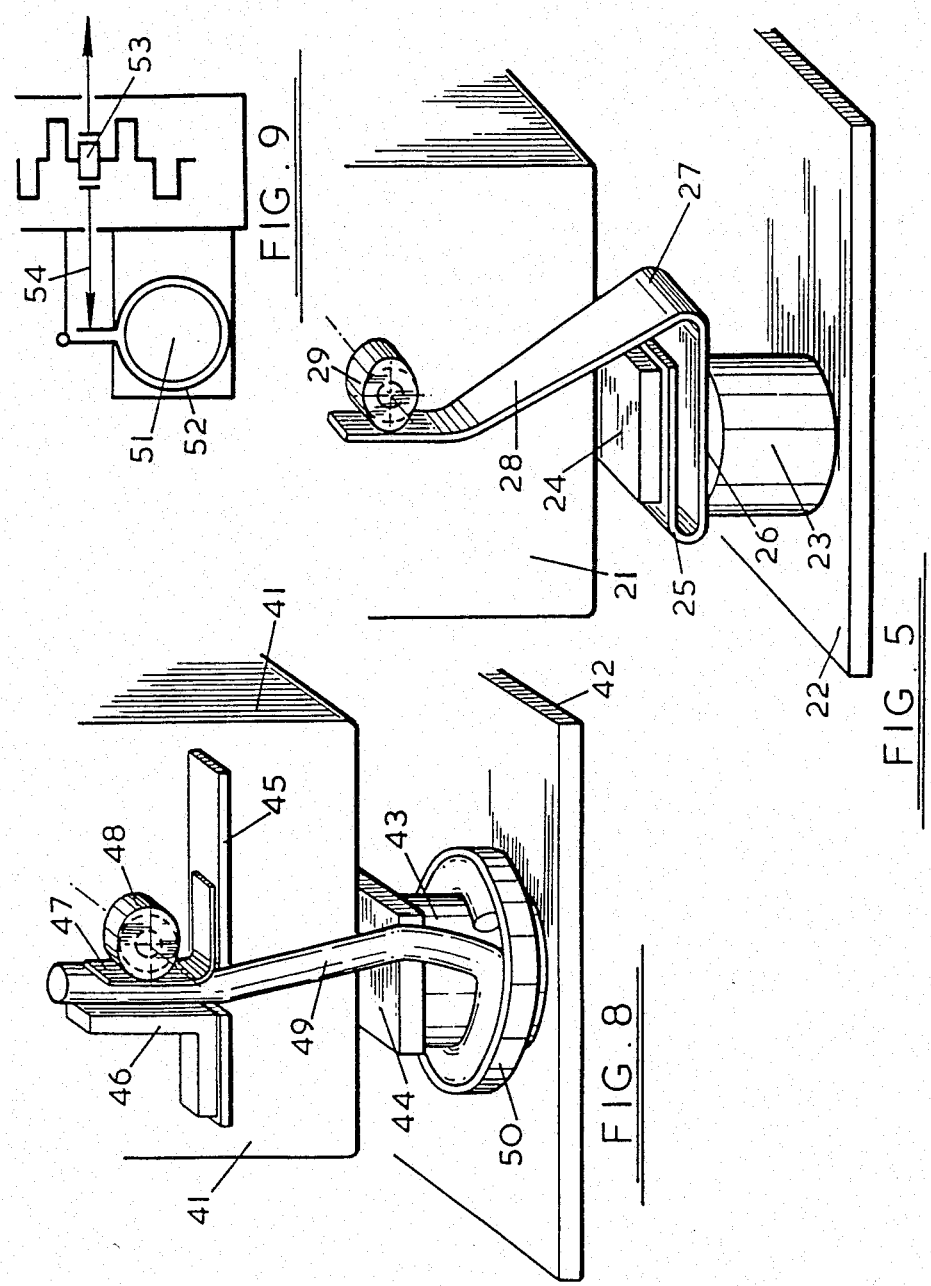

MOUNTING FOR A VIBRATING SYSTEM

The present invention relates to a mounting for a vibrating system, and in particular to a mounting capable of eliminating or substantially reducing the transmission of vibration from a vibrating system to its support base.

In order to reduce the transmission of vibration from a vibrating system to its support base it is known to interpose a resilient mounting between the vibrating system and its base. The resilient mounting is alternately compressed and expanded as the system vibrates and some of the motion of the system is thus absorbed. However, even if the resilient mounting has a low elastic resistance its deflection by the vibrating system requires a force which in turn causes vibratory motion of the base.

In the case of reciprocating engines it is also known to try to reduce the vibration of the engine itself, so as to reduce the amount of vibration which the mounting and base have to accommodate. The fundamental harmonic of the inertia force generated by the reciprocation of the pistons and the corresponding motion of the connecting rods can be eliminated by attaching balancing masses to the crankshaft or by arranging the cranks to be symmetrical. However, all harmonics which are even and whose order is equal to a multiple of half the number of cylinders remain unbalanced and give rise to vibrations which can be transmitted to the base. This is of particular significance in a four cylinder in-line engine where the lowest unbalanced harmonic is of the second order, since the magnitude of the inertia force harmonics decreases rapidly as the order increases. For example, in a six cylinder engine the lowest unbalanced harmonic of the inertia force is the sixth harmonic, which is almost negligible as compared with the second. The presence of this large second order harmonic component of inertia force in a four cylinder engine induces sinusoidal vibration of the whole engine in the plane containing the axes of the cylinders. The amplitude of this vibration is equal to the product of the crank radius and the ratio of the secondary equivalent unbalanced mass to the mass of the whole engine, which for an average sized engine of say 2000 cc is typically 0.1 mm. The actual motion of the engine is to some extent affected by the mountings which support it, but at high engine speeds this effect becomes quite insignificant. The frequency of vibration is equal to twice the frequency of rotation of the engine, which at say 3000 rpm is 100 Hz. This is quite audible and often constitutes a nuisance known as boom.

It has been proposed in British Pat. No. 1 370 682 to seek to eliminate the transmission of vibrations from an engine to its base by mounting a cam driven in synchronism with the engine on the engine so as to bear against a slide block mounted on the base. The base and engine are connected by resilient mountings. This system effectively moves the entire engine relative to its base in a direction opposite to the vibratory movement of the engine. The forces required to produce the necessary movement are however considerable and it is unlikely that the proposed system can be applied to any but the lightest of machines, for example hand-held tools.

It has been proposed in U.S. Pat. No. 4,154,206 to interpose a hollow resilient mounting between an engine and its base and to connect the hollow interior of the mounting to a hydraulic system. A cam driven at engine speed acts on a master cylinder to control the hydraulic pressure in the hollow mounting which in effect acts as a slave cylinder. By appropriate control of the hydraulic pressure the transmission of vibrations through the mounting can be eliminated. This system does however exhibit certain problems. Firstly, as the slave cylinder is in the main load path between the engine and the base any shocks applied to the base are transmitted directly into the hydraulic system. The specification proposes certain measures to overcome these problems but these measures increase the complexity of the system to an undesirable extent. Secondly, the hydraulic system must be substantial to handle the forces upon it and thus it has a relatively slow response time. Although the system can be set up to operate correctly at one engine speed it will of necessity be seriously out of phase at other speeds. Thirdly, applying pressure to the interior of the mounting causes distortion of the mounting body in all directions whereas distortion in only one direction is required for the purpose of vibration elimination. This results in a waste of energy.

It is an object of the present invention to provide an improved mounting.

According to the present invention there is provided a mounting for interposition between a vibrating system and a support base for the system, the mounting comprising a deformable structure having a first portion which bears against and supports the vibrating system and a second portion which bears against and is supported by the support base such that a load transmitting path is defined between the two said portions, and means for deforming the mounting structure in synchronism with the vibration of the system such that the force exerted by the second portion on the support base remains substantially constant, wherein the deforming means is operative to apply an external deforming force to the mounting structure at a portion of the structure spaced from the load transmitting path.

By spacing the point of application of the external deforming force from the load path the deforming means is effectively bypassed by the forces transmitted through the mounting which do not result from the vibration that is to be eliminated.

In a first preferred embodiment of the invention the mounting comprises a lever system connected to the deformable structure which may be for example a flexible cantilever. One end of the cantilever is connected to the vibrating system, e.g. an internal combustion engine, and the other end is supported on a resilient member such as a rubber block located on a vehicle body. A substantially rigid lever is attached to the cantilever and acted upon by a force derived from a cam driven in synchronism with the engine.

In a second preferred embodiment, the deformable member comprises a spring an extension of which constitutes the lever system which is acted upon to deform the spring. The spring may comprise for example an engine supporting central portion extending between two resilient base mounted supports and two lever arms extending from the central portion. Alternatively the spring may be U-shaped, one limb of the U supporting the engine and the other resting on a resilient base mounted support. A lever arm extends from the other limb. In both cases the lever arm or arms are acted upon by a force derived from a cam driven in synchronism with the engine.

In a third preferred embodiment, the deformable structure comprises a resilient member and the deforming means comprises a device such as a steel hoop or a hydraulic hoop for applying pressure to the exterior of the resilient member to control its dimensions.

Embodiments of the present invention will now be described, by way of example, with reference to the accompanying drawings, in which:

FIG. 1 shows a schematic view of a first embodiment of the present invention for eliminating the transmission of second order harmonic vibrations from an engine to its support base;

FIGS. 2 and 3 illustrate details of the arrangement of FIG. 1; and

FIGS. 4 to 9 schematically illustrate a further six embodiments of the invention.

Referring to FIG. 1, the outline of an overhead camshaft four cylinder in-line vehicle engine 1 is illustrated. Such an engine will have three mountings, two at one end of the engine and the third at the other. The illustrated arrangement is intended to prevent the transmission of vibrations from the two mountings at one end of the engine to the vehicle body. One of these mountings is illustrated in FIG. 1.

The mounting of FIG. 1 comprises a cylindrical rubber block 2 which is identical to a conventional engine mounting. The bottom end of the block 2 rests on the vehicle body (not shown) and the top end bears against a spot welded fitting 3 (FIG. 2) flexibly linked to an engine mounted bracket 4. The bracket 4 comprises a flexible arm 5, the end of the arm being connected to a rigid lever arm formed by a plate having two flanged edges 6. The flanges 6 stiffen the lever arm which with the bracket 4 defines a cantilever supported on the block 2, the cantilever being flexible only in the arm portion 5 of the bracket. The block 2 is located approximately three quarters of the way along the cantilever towards the bracket 4.

The end of the lever arm plate is secured to one end of a tie rod 7, the other end being secured to a beam 8 (FIG. 3) located above the camshaft and outside the engine casing. The vertical position of the beam 8 is determined by a cam follower 9 which bears against a four lobed cam 10 on the camshaft 11. The cam follower 9 extends through a stabilising and sealing grommet 12 in the engine casing (not shown in FIG. 3). A second tie rod extends from the beam 8 to the other mounting (not shown) which is identical to that illustrated.

As the camshaft rotates, the beam 8 oscillates up and down. By appropriate design of the cam and the lever system formed by the beam 8, the rod 7, and the cantilever, vibrations resulting from the rotation of the engine can be prevented from reaching the vehicle body. The cantilever pivots relative to the fitting 3 and thus although there is some flexing of the cantilever no twisting force (which would result in vibrations) is transmitted into the block 2. If the engine or vehicle body is subjected to shocks, for example as the result of road induced vibrations, these shocks are transmitted almost entirely via the main load transmitting path defined through the block 2 to the bracket 4 in the normal way. A small component of these shocks will be transmitted into the lever system but this will not be sufficient to disrupt operation of the vibration eliminating system.

In the described embodiment it is assumed that the third engine mounting is a standard resilient mounting. If this third mounting is placed near the axis of rocking of the engine the transmission of vibrations through it will be minimised. In typical engines the distance between the third mounting and the axis of rocking is often of the order of 10 cm although considerably greater distances can be found. An ideal arrangement is found when the universal joint of the propellor shaft and the third mounting are both as near as possible to the axis of rocking.

In order to maximise the reduction of vibration transmission, it is necessary to maintain an appropriate phase relationship between the angular displacement of the cam and the displacement of the deformable mounting for as wide a range of engine speeds as possible. To achieve this, as the time delay between movement of the cam and the resultant deformation of the mounting depends on the rigidity of the intervening mechanism, it is necessary to make this mechanism as rigid as possible. Materials such as carbon fibre composites can be used to advantage to form for example the rod.

Referring now to FIG. 4, the illustrated embodiment comprises two flat elastic cantilever plates 13 (only one of which is shown) which are fixed at one end to brackets 14 secured to the engine while the other ends are moved sinusoidally through a simple linkage comprising rods 15 and 16 by a cam 17 fixed to the crankshaft of an engine. A stabilising ligament 18 holds a cam follower 19 in position. Rubber mountings 20 (only one of which is shown) are in contact with the cantilevers at appropriate distances from the ends fixed to the engine brackets 14. The deflection of the cantilevers is again related to the amplitude of the sinusoidal displacement of the engine so that the compression of the rubber supports is constant corresponding only to the weight and not the vibration of the engine.

Referring now to FIG. 5 there is shown in schematic form a third embodiment of the present invention for eliminating the transmission of second order harmonic vibrations from a reciprocating engine 21 to a base 22. The engine 21 is supported on the base 22 by a cylindrical rubber body 23, a supporting plate 24, and between the body 23 and the plate 24, two horizontally orientated limbs 25 and 26 of a three limbed flexible interstitial element 27. The horizontal limbs 25 and 26 together define a U-shaped spring member, and the free end of the other limb 28 defines a lever arm which extends substantially vertically and contacts a two lobed cam 29.

The flexible interstitial element 27 is rigid enough to support the static weight of the engine 21, but at the same time is sufficiently flexible to allow the two horizontal limbs 25 and 26 to move towards and away from each other as the engine 21 vibrates and the cam 29 applies a cyclically varying horizontal force to the third limb 28.

In operation the cam 29 is synchronised to apply an increased horizontal force to the third limb 28 as the second order harmonic component of the inertia force of the engine 21 acts downwards and to apply a reduced horizontal force as the second order harmonic component of the inertia force of the engine 21 acts upwards. Naturally, if the limb 28 were stationary, as the inertia force of the engine 21 acted downwards the horizontal legs 25 and 26 would move downwards with it, and as the inertia force of the engine acted upwards they would move upwards with it. The application of a cyclically varying horizontal force to the third limb 28 as described above is effective however to exert a force on the lower horizontal limb 26 sufficient to maintain the limb 26 stationary despite the movement of the upper horizontal limb 25. It will be appreciated therefore that as the upper horizontal leg 25 moves with the engine the lower horizontal leg 26 remains stationary and therefore no vibration is transmitted from the engine 21 to its base 22.

Referring to FIG. 6, the illustrated arrangement is similar to that of FIG. 5 except that the intersticial element consists of two generally vertical lever arm members 30 linked by a central portion defining a horizontal spring member 31. As cam 32 pushes apart the vertical members, the horizontal member deflects upwards at its central section and follows the engine in its upwards excursion while the sections of the horizontal member resting on mountings 33 remain stationary with respect to the base 34.

In the schematically illustrated embodiment of FIG. 7, a cam 35 is fixed to the crankshaft inside the crankcase between two adjacent cranks or possibly between a crank and a bearing. As the force on the cam 35 is much smaller than that operating the engine valves, the axial length of this cam is only a fraction of that of the valve cams. Two push-rods 36, stabilised by vertical ligaments 37, pass through the walls of the crankcase via flexible grommets and operate vertical members of double L-shaped elements 38. Central portions of the elements 38 rest on standard mountings 39, the upper limbs contacting the push rods 36 and the lower limbs being secured to the engine casing. The standard mountings 39 are in contact with a vehicle body 40.

Referring to FIG. 8, there is shown in schematic form a further embodiment of the present invention. An engine 41 is supported on a base 42 by a cylindrical rubber mounting 43, against which a supporting plate 44 bears.

Secured to the engine 41 is a further supporting plate 45, on which is mounted a backing plate 46 and a flexible compression plate 47 which is acted upon by a two lobed cam 48 connected to the crankshaft of the engine 41. The crankshaft axis is indicated by a dashed line. Located between the backing plate 46 and the compression plate 47 is the free end of a closed rubber tube 49 which is filled with an incompressible fluid, for example brake fluid.

As the two lobed cam 48 rotates it applies pressure via the compression plate 47, to the free end of the tube 49 at twice the frequency of rotation of the crankshaft of the engine.

The other end of the rubber tube 49 is wrapped around the cylindrical rubber body 43 and the rubber tube 49 is prevented from expanding by a rigid armouring 50 (shown only around that portion of the tube 49 around the resilient cylindrical body 43) except at that portion of its surface in contact with the rubber body 43.

As pressure is applied to the free end of the tube 49 by the cam 48, via the compression plate 47, the portion of the rubber tube 49 located against the resilient cylindrical body 43 expands.

The expansion of the rubber tube 49 applies radial pressure to the rubber body 43 which results in the axial dimension of the body 43 increasing. The force applied to the body 43 by the tube 49 is orthogonal to the force exerted on the body 43 by the engine. When the pressure is removed from the tube 49 the body 43 returns to its original dimension. (It should be realised here that the increase in the axial dimension of the body 43 does not involve an axial force or pressure; both changes, the radial and the axial, are caused by the radial pressure alone). The change in the axial dimension of the body 43 is quite independent of the static compression of the body 43. Thus, while the body supports the weight of the engine, its axial dimension changes sinusoidally with the rotation of the cam 48 so that its upper face can be synchronised to move with the engine 41 without involving vibratory forces, and its lower face remains stationary. Thus the base 42 also remains stationary and vibration free.

The embodiment of FIG. 9 is dependent upon Poisson's type deflection of cylindrical rubber mountings 51 in a similar manner to the embodiment of FIG. 8. However the required radial force is applied not by hydraulic pressure as in FIG. 8 but by an elastic steel hoop 52 which is operated by a cam 53 acting on a pushrod 54. One end of the hoop 52 is fixed so that movements of the other end determine the radial compression of the mounting 51.

The power losses resulting from the use of the described embodiments of the invention may be very small indeed. For example, in the embodiment of FIGS. 1 to 3 the forces acting on the cam 10 relieve the forces acting on the pins of the camshaft from its bearings. Hence there is no or minimal nett loss of power. There could even be a small gain, because the cam can be of smaller diameter than the bearings. Furthermore the system avoids losses due to the distortion of the resilient rubber mountings which would occur if vibrations were transmitted through them.

It will be appreciated that in all of the embodiments described above the mounting provides a main load transmitting path and that the force applied to the mounting to prevent the transmission of vibrations is applied externally to the mounting at a point or region spaced from the load transmitting path. Thus the mounting can transfer shocks resulting from for example road induced vibrations in the normal way, bypassing the anti-vibration system. Furthermore the forces which must be delivered by the anti-vibration system can be relatively small compared with the forces transmitted through the mounting.

It will also be appreciated that by changing the number of lobes provided on the cam operating the system other orders of harmonics causing vibration may be eliminated.

It will also be appreciated that means other than a cam driven by a vibrating system may be provided to synchronise the movement of the mounting with the vibration. For example, electronic, electro-magnetic, and hydraulic devices may be used.

Finally it will be appreciated that the present invention is not restricted to use with reciprocating engines, but can be used to eliminate the transmission of vibration from any vibrating system to its support base.

What is claimed is:

1. A mounting for interposition between an overhead camshaft internal combustion engine and a support base for the engine, the amounting comprising a deformable structure having a first portion which bears against and supports the engine and a second portion which bears against and is supported by the support base such that a load transmitting path is defined between the two said portions, and means for deforming the mounting structure in synchronism with the vibration of the engine such that the force exerted by the second portion on the support base remains substantially constant, wherein the deforming means is operative to apply an external deforming force to the mounting structure at a portion of the structure spaced from the main load transmitting path and comprises a lever system connected to the deformable structure and acted upon by a force which varies in synchronism with the vibration of the engine, wherein the deformable structure comprises a resilient cantilever one end of which is connected to the engine and the other end of which is supported by a resilient member located on the base, the lever system comprising a substantially rigid lever attached to the said other end of the cantilever and wherein the lever is connected by a tie rod to a beam positioned adjacent the camshaft and acted upon by a cam follower in contact with a cam rotating with the camshaft.

2. A mounting for interposition between an internal combustion engine having a crankshaft and a support base for the engine, the mounting comprising a deformable structure having a first portion which bears against and supports the engine and a second portion which bears against and is supported by the support base such that a load transmitting path is defined between the two said portions, and means for deforming the mounting structure in synchronism with the vibration of the system such that the force exerted by the second portion on the support base remains substantially constant, wherein the deforming means is operative to apply an external deforming force to the mounting structure at a portion of the structure spaced from the main load transmitting path and comprises a lever system connected to the deformable structure and acted upon by a force which varies is synchronism with the vibration of the engine, wherein the deformable structure comprises a resilient cantilever one end of which is connected to the engine and the other end of which is supported by a resilient member located on the base, the lever system comprising a substantially rigid lever attached to the said other end of the cantilever, and wherein the lever is connected by a linkage to a cam follower acted upon by a cam rotating with the engine crankshaft.

* * * * *